United States Patent [19]

Schnizler

[11] Patent Number: 4,870,755
[45] Date of Patent: Oct. 3, 1989

[54] JIGSAW WITH PNEUMATIC DUST BLOWER

[75] Inventor: Albrecht Schnizler, Nürtingen, Fed. Rep. of Germany

[73] Assignee: Metabowerke GmbH & Co., Fed. Rep. of Germany

[21] Appl. No.: 240,808

[22] Filed: Sep. 6, 1988

[30] Foreign Application Priority Data

Oct. 8, 1987 [DE] Fed. Rep. of Germany ....... 3734013

[51] Int. Cl.⁴ .............................................. B25F 3/00
[52] U.S. Cl. ..................................... 30/123.3; 83/169
[58] Field of Search .................... 30/123.3; 173/73, 78; 83/168, 169; 408/56; 407/11

[56] References Cited

U.S. PATENT DOCUMENTS 3,338,276  8/1967  Reed .................................. 30/123.3

Primary Examiner—Frank T. Yost
Assistant Examiner—Willmon Fridie, Jr.
Attorney, Agent, or Firm—Charles E. Baxley

[57] ABSTRACT

A power tool has a housing, a blade support reciprocal in the housing, a blade carried on the support for joint reciprocation therewith and projecting from the housing at a work area, and a drive in the housing for reciprocating the support and blade. A bulb generally fixedly mounted in the housing adjacent the support, elastically compressible from a large volume to a small volume, and having an outlet is operatively engageable with an actuator formation between the blade support and the bulb so as to compress the bulb each time the support reciprocates and thereby emit a gust of air from the bulb outlet. A nozzle or conduit is mounted on the outlet and open at the work area for directing the gusts of air at the area and thereby blowing chips and dust created by the blade from the area with each reciprocation of the blade.

7 Claims, 1 Drawing Sheet

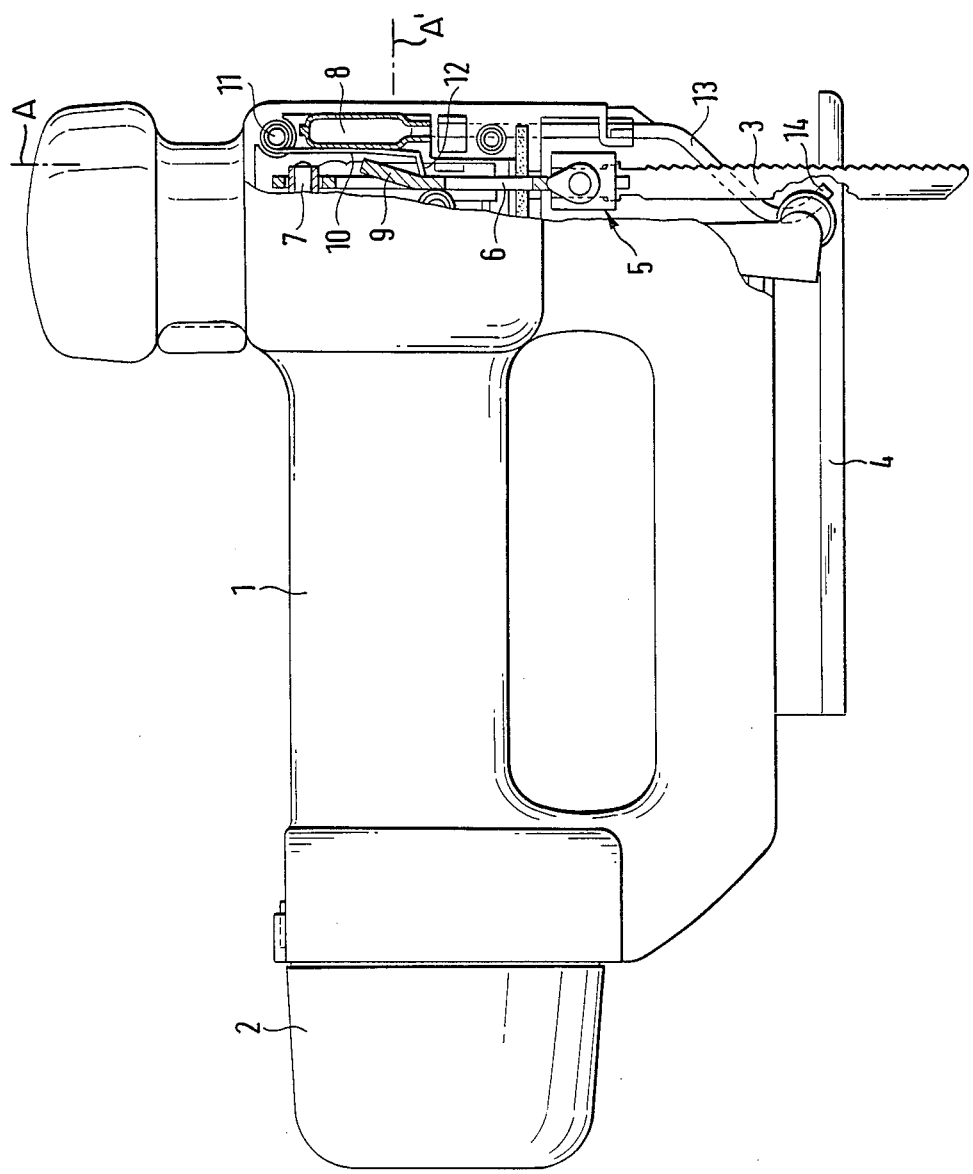

JIGSAW WITH PNEUMATIC DUST BLOWER

FIELD OF THE INVENTION

The present invention relates to a reciprocating and dust- or chip-generating power tool. More particularly this invention concerns a battery-powered jigsaw or the like.

BACKGROUND OF THE INVENTION

It is standard to vent the output of the cooling fan on a power tool so that it blows chips and dusts away from the work area, giving a clear view of the place where the bit or blade engages the workpiece. When, however, the tool is of the light-duty battery-powered type no such cooling fan is provided, in particular when the bit or blade is reciprocated such construction does not lend itself to the simple addition of a fan blade.

German Pat. No. 1,094,968 describes a reciprocating-blade tool wherein a small piston-and-cylinder unit is provided that is coupled to the blade chuck. On each reciprocation of the chuck the piston is similarly reciprocated and the output of the unit is directed at the work area. Thus on each reciprocation of the tool, a gust of air is emitted that blows away dust and chips.

This latter arrangement is fairly complicated so that it adds considerably both to the cost and weight of the tool. Thus installation of such a unit in a battery-powered tool is not advantageous.

OBJECTS OF THE INVENTION

It is therefore an object of the present invention to provide an improved chip-and-dust-clearing blower for a reciprocating power tool.

Another object is the provision of such a chip-and-dust-clearing blower for a reciprocating power tool which overcomes the above-given disadvantages, that is which is light in weight, simple and inexpensive in construction.

SUMMARY OF THE INVENTION

These objects are attained according to this invention in a power tool having a housing, a blade support reciprocal in the housing, a blade carried on the support for joint reciprocation therewith and projecting from the housing at a work area, and a drive in the housing for reciprocating the support and blade. According to this invention a bulb generally fixedly mounted in the housing adjacent the support, elastically compressible from a large volume to a small volume, and having an outlet is operatively engageable with an actuator formation between the blade support and the bulb so as to compress the bulb each time the support reciprocates and thereby emit a gust of air from the bulb outlet. A nozzle or conduit is mounted on the outlet and opens at the work area for directing the gusts of air at the area and thereby blowing chips and dust created by the blade from the area with each reciprocation of the blade.

This system is extremely simple. The elastomeric bulb is extremely light and inexpensive, and the energy employed to compress it and emit the necessary tiny gust of air is nominal so that the chip clearer of this invention adds no significant load to the drive motor of the tool. This means that this arrangement can be used even on a light-duty battery-powered tool.

According to the invention the bulb is elongated and the support is displaceable generally parallel to the elongated bulb. The actuator includes a lateral projection on the support operatively engageable with the bulb on each reciprocation. In addition this actuator includes a deflectable stiff plate lying against the bulb and engageable with the lateral projection. The plate is a leaf spring having one end pivoted on the housing and an opposite free end lying between the pivoted end and the work area. The spring extends generally parallel to the displacement direction of the support and the free end of the spring is bent outward toward the support. Similarly, the support is a plate having a bend-out tab engageable with the free end of the spring.

DESCRIPTION OF THE DRAWING

The above and other objects, features, and advantages will become more apparent from the following, reference being made to the accompanying drawing whose sole FIGURE is a side partly sectional view of a power tool according to this invention.

SPECIFIC DESCRIPTION

As seen in the drawing a portable jigsaw with a battery pack 2 has a housing 1 and a blade 3 secured in a chuck 5 and extending along an axis A perpendicular to a sole plate 4 of the tool. The chuck 5 is carried on the lower end of a flat actuator plate 6 that is displaced in a plane including the axis A and perpendicular to the flat blade 3 by means of a crank 7 that is orbited by an unillustrated motor in the housing 1 about an axis A' perpendicular to the axis A and parallel to the sole plate 4 and the plane of the blade 3.

According to this invention an elastomeric bulb 8 is mounted in the housing 1 adjacent the vertically reciprocal plate 6. A spring-steel plate 10 is formed as a torque spring and pivoted at 11 above the bulb 11 and lies against the side of the bulb 8 turned toward the plate 6, the opposite side of the bulb 8 being braced against the inside surface of the front wall of the housing 1. The plate 9 has a tab 9 bent forward toward the plate 10 and the lower end of this plate 10 has a rearwardly bent tab 12 engageable with this tab 9. In addition the bulb 8 has a mouth connected to a tube 13 terminating at 14 immediately above and behind the region where the blade 3 crosses the sole plate 4, that is at the work area.

The tabs 9 and 12 coact such that each time the plate 6 descends the plate 10 is pivoted toward the front, compressing the bulb 8. This action causes a small gust of air to be emitted from the tube end 14, blowing the work area clear. As the plate 6 rises back to its starting position, the bulb 8 elastically resumes its maximum-volume normal shape, taking in a quantity of air to be ejected with the next blade descent.

I claim:
1. In a power tool having
   a housing,
   a blade support mounted for reciprocal movement in the housing,
   a blade carried on the support for joint movement therewith and projecting from the housing at a work area, and
   drive means in the housing for causing the reciprocal movement, an improvement comprising:
   a bulb connected to the housing adjacent the support, elastically compressible and expandable between a large volume and a small volume, and having a bulb outlet;
   actuator means operatively connected between the blade support and the bulb for compressing the bulb each time the support reciprocates thereby emitting a gust of air from the bulb outlet; and nozzle means mounted on the bulb outlet and open at the work area for directing the gust of air at the work area, thereby blowing chips and dust created by the blade from the work with each reciprocation of the blade.

2. The power tool defined in claim 1 wherein the bulb is elongated and the support is displaceable generally parallel to the elongated bulb, the actuator means including a lateral projection on the support operatively engageable with the bulb on each reciprocation.

3. The power tool defined in claim 2 wherein the actuator means includes a deflectable stiff plate lying against the bulb and engageable with the lateral projection.

4. The power tool defined in claim 3 wherein the plate is a leaf spring having one end pivoted on the housing.

5. The power tool defined in claim 4 wherein the spring has an opposite free end lying between the pivoted end and the work area.

6. The power tool defined in claim 5 wherein the spring extends generally parallel to the displacement direction of the support and the free end of the spring is bent outward toward the support.

7. The power tool defined in claim 6 wherein the support is a plate having a bend-out tab engageable with the free end of the spring.

* * * * *